Jan. 16, 1934.   E. B. PAINE ET AL   1,943,391
METHOD OF AND MEANS FOR TESTING INSULATION
Filed Dec. 22, 1930    7 Sheets-Sheet 1

Inventors
Ellery B. Paine,
Joseph Tykocinski Tykociner,
Hugh A. Brown.
By Brown Jackson Boettcher & Dienner
Attys Jan. 16, 1934. E. B. PAINE ET AL 1,943,391
METHOD OF AND MEANS FOR TESTING INSULATION
Filed Dec. 22, 1930 7 Sheets-Sheet 2

Inventors:
Ellery B. Paine,
Joseph Tykocinski-Tykociner,
Hugh A. Brown.
By Brown, Jackson, Boettcher-Dienner.
Attys.

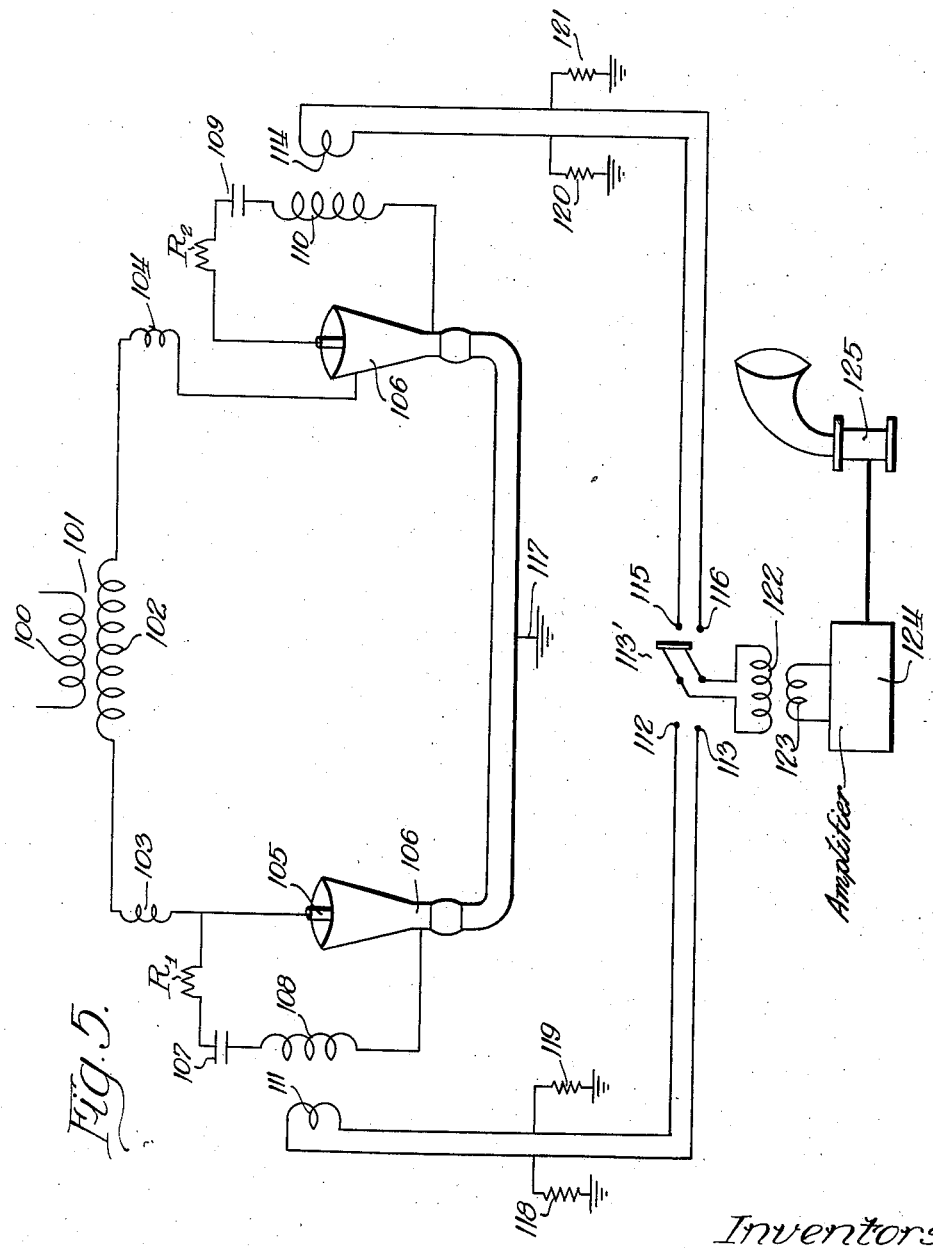

Jan. 16, 1934.  E. B. PAINE ET AL  1,943,391
METHOD OF AND MEANS FOR TESTING INSULATION
Filed Dec. 22, 1930  7 Sheets-Sheet 4
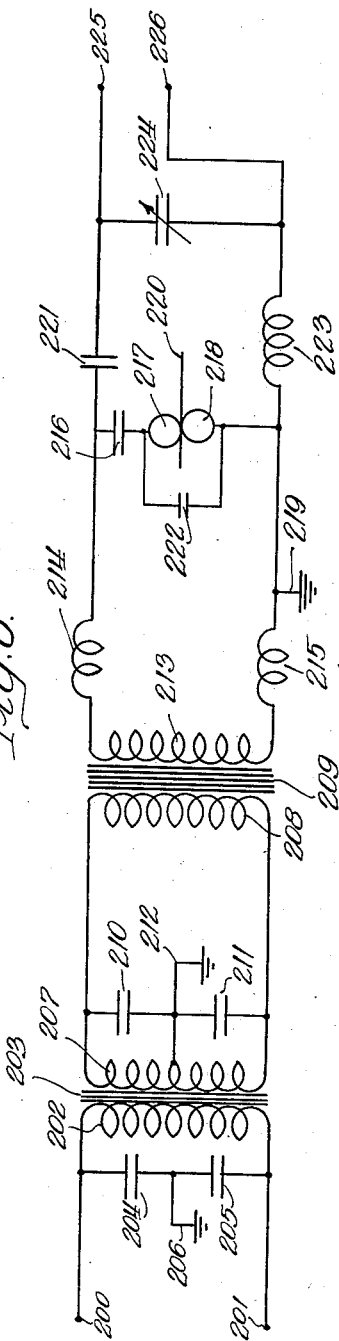
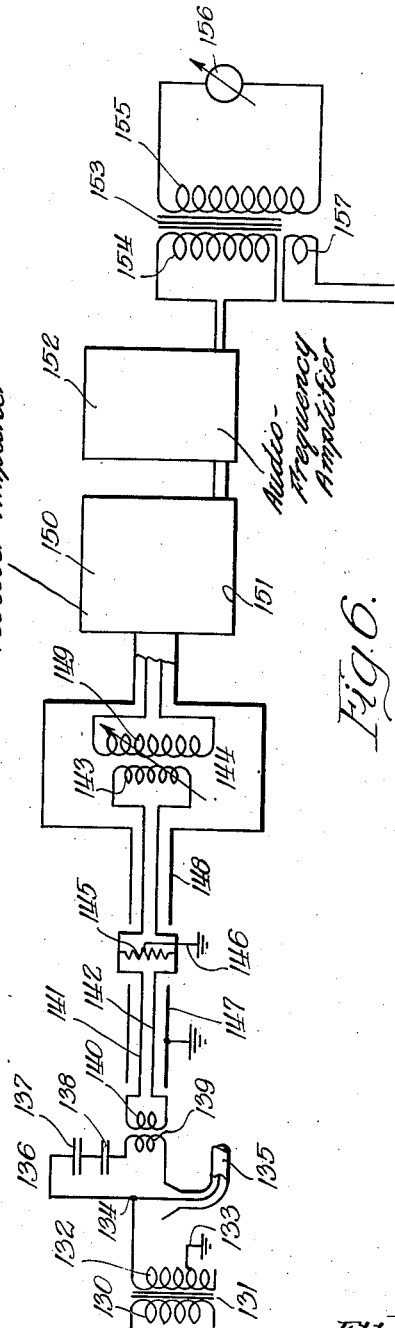
Inventors:
Ellery B. Paine,
Joseph Tykocinski Tykociner
Hugh A. Brown
By Brown, Jackson, Boettcher & Dienner
Attys

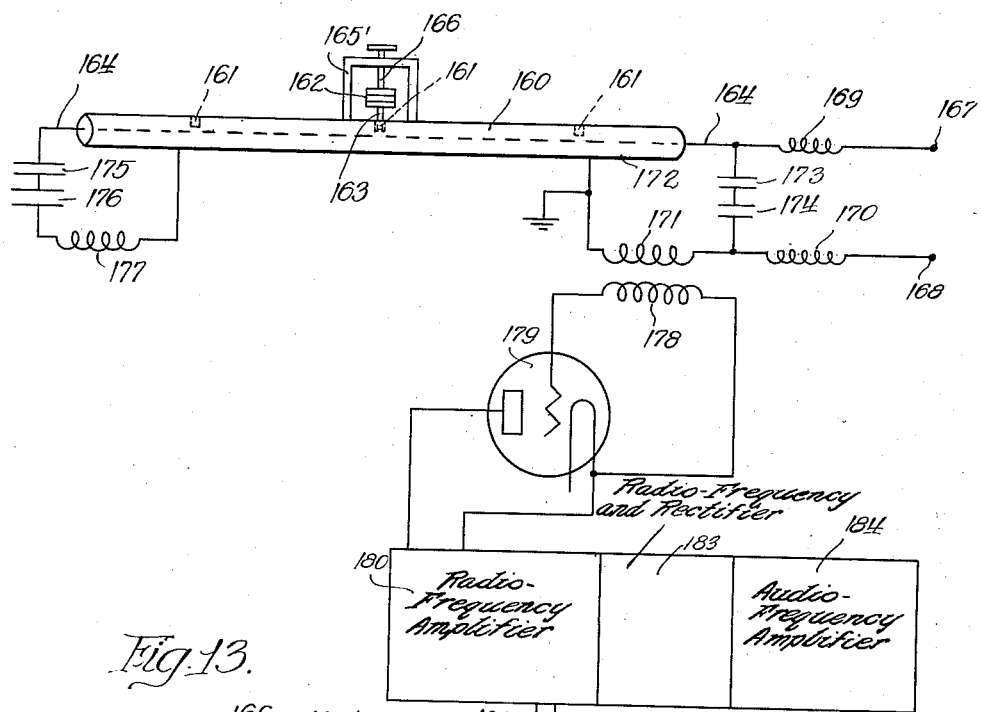
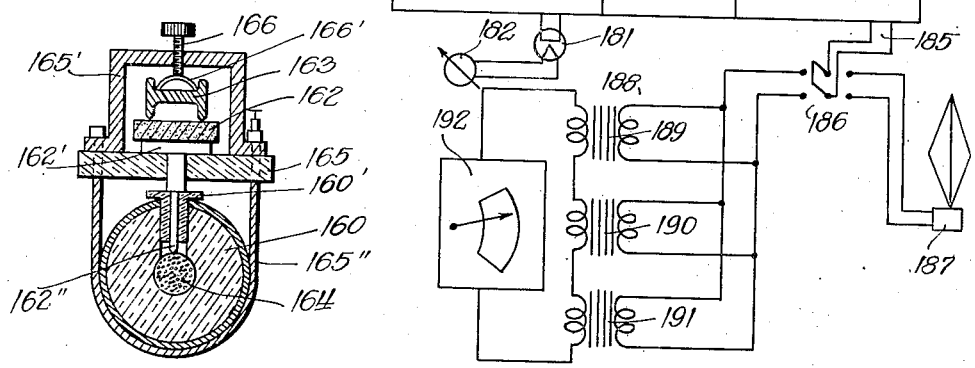

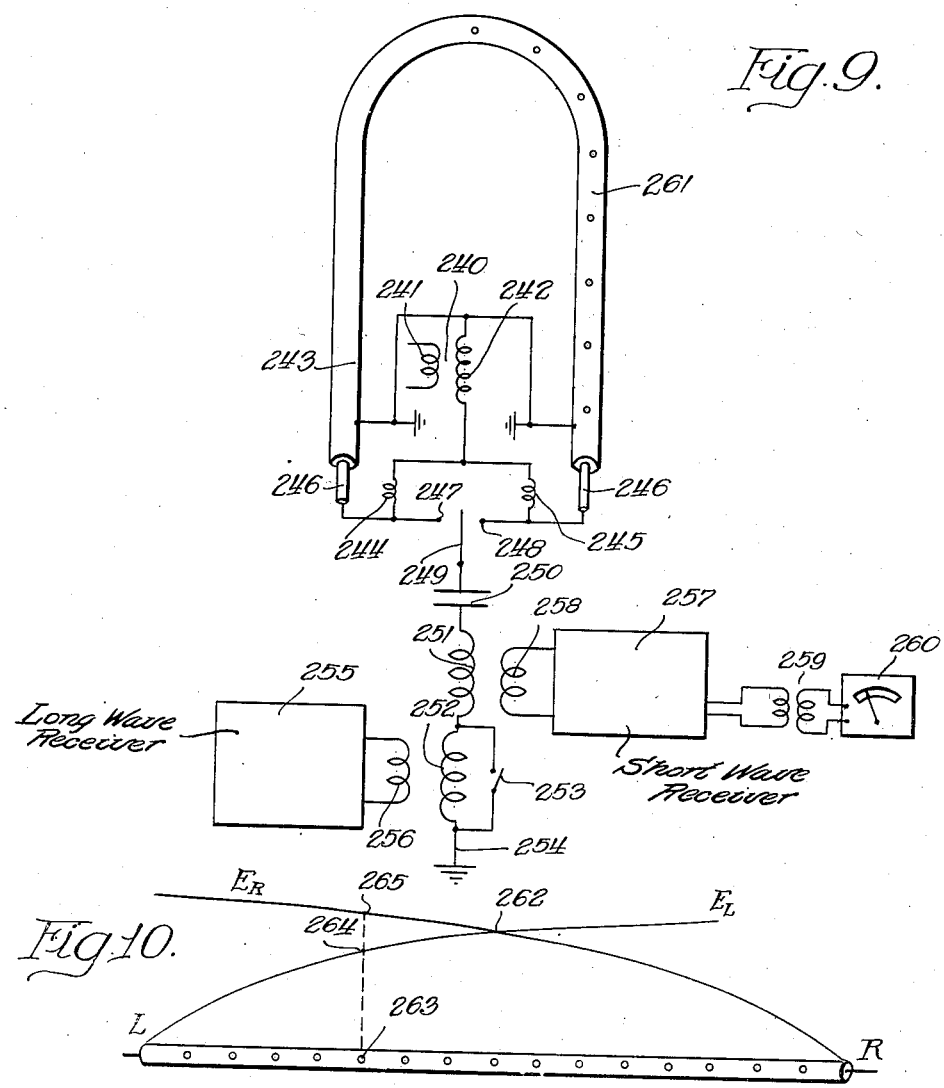

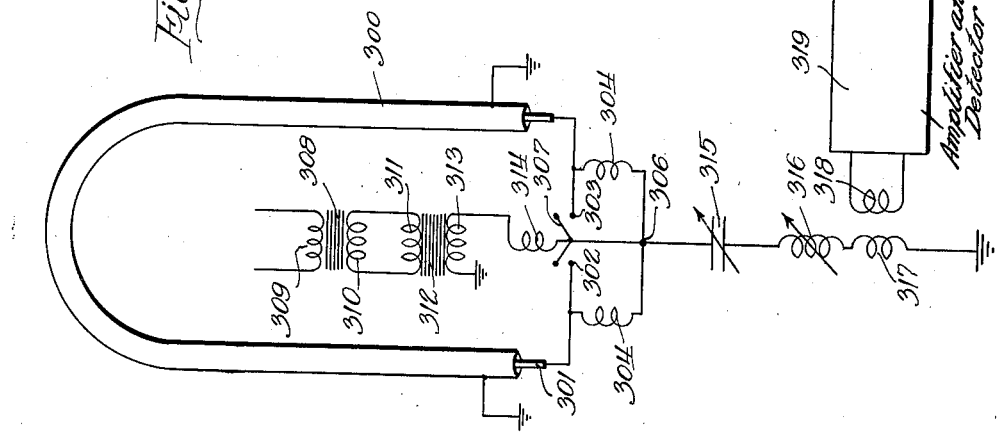
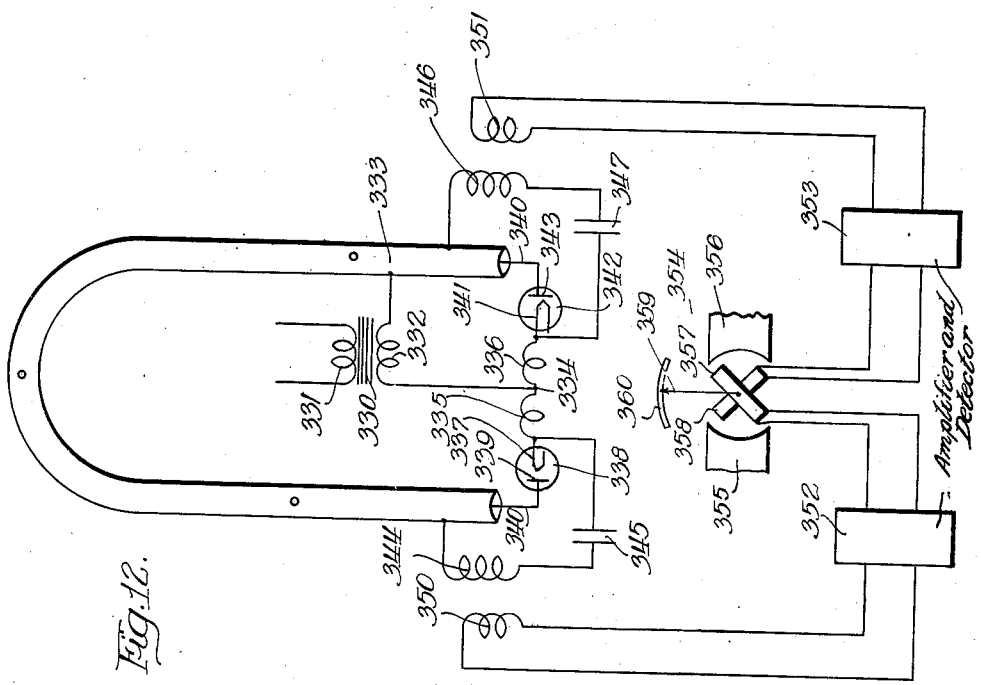

Patented Jan. 16, 1934

1,943,391

UNITED STATES PATENT OFFICE 1,943,391

METHOD OF AND MEANS FOR TESTING INSULATION

Ellery B. Paine, Joseph Tykocinski-Tykociner, and Hugh A. Brown, Urbana, Ill., assignors to Board of Trustees, University of Illinois, Urbana, Ill., a corporation of Illinois Application December 22, 1930
Serial No. 504,045

30 Claims. (Cl. 175—183)

This invention relates to a method of and means for testing insulation.

It is known that inhomogeneities in insulation, however slight, are acted upon by electrical and mechanical stresses set up in the insulation when it is subjected to an operating potential, to increase the inhomogeneity, this increase continuing until the insulation eventually breaks down. Thus, in an insulating oil employed as a dielectric between the plates of a high voltage condenser, the presence of small gas bubbles or solid particles in the oil constitute inhomogeneities which are attacked by the electrical stress under which the condenser is working, and the insulating qualities of the oil thereby are deteriorated and caused eventually to break down at the points where the inhomogeneities occur. Also, in cables or condensers wherein paper impregnated in oil is used as an insulating material, the presence of small bubbles of gas or the like in the oil or paper constitute inhomogeneities which are acted upon and the insulating property of the combination deteriorated until breakdown eventually occurs. Thus an insulating material which at first is capable of withstanding a certain electrical potential without breakdown seems to deteriorate until that same electrical potential, or for that matter an even smaller potential, will eventually break down the insulating material.

We have found that electrical forces acting upon insulating material produce thermal, chemical or mechanical changes in the material and that they also produce periodic or aperiodic electrical disturbances which may be utilized to gauge the qualities of the insulating material itself. It is well known in the art that weak spots in a cable that are in imminent danger of breakdown cause electrical disturbances which can be detected by means of a receiving apparatus such as the listening stick that has been heretofore commonly used to detect faulty cables.

Some dielectrics show qualities which, like for instance the dielectric losses as a function of the applied voltage, increase slowly up to a certain critical voltage and then increase at a much greater rate. Also, we have noticed that at a certain critical voltage disturbances in the form of harmonics of the original charging current appear in the circuit which contains such a dielectric under investigation. A part of these disturbances are traceable to the impurity of the voltage sine wave of the alternator which supplies the charging current. The remainder of the disturbances, however, are so persistent that we have to ascribe their origin as residing in the dielectric itself. We know that molecular movements are produced in a dielectric that is subjected to high electric stresses and that these movements cause more or less complex variations of the charging currents. By analysis these variations may be shown to be composed of a single or of a series of sine waves and, therefore, they may be called harmonics. Their appearance may therefore be used to indicate an incipient breakdown, which usually occurs at the weakest spot. Whether the latter existed from the very start or developed in course of service is of no moment, since the existence of weak spots signifies inhomogeneities in the dielectric.

In our present invention, we have provided a method of and means for testing the insulating properties of cable insulation, condenser insulation, and the like, so that the quality of the insulation of these devices may be accurately determined and from that the safe operating voltage to which they can be subjected can be computed without difficulty; hence the cable, when it is installed in service, will certainly operate at a given potential over a satisfactorily long period of time without breakdown. It is known that these inhomogeneities in the insulation reduce its quality, and our device, in predicting an approaching danger, by detecting and locating such faults while they are still so small as to be undetectable by devices employed heretofore, makes a distinct step forward in the art.

In the testing of condensers wherein the width and length of the mass of dielectric are comparable to its thickness, it is usually sufficient to determine the presence of inhomogeneities in the insulating medium without specifically locating the points at which these inhomogeneities occur. However, in the testing of cable insulation, and other similar insulation wherein the length of the insulating medium is very much greater than its thickness, it is equally as important to determine the location of the inhomogeneity as it is to determine that such inhomogeneity exists.

From the fact that the action of high electrical potentials upon insulation produces an electrical disturbance, we have found that such condition is caused by a change in the dielectric constant and conductivity of the inhomogeneity in the material and that that local change can be utilized to determine the presence of the inhomogeneities. For example, if the insulating medium under stress is the insulation of a length of cable and sufficient voltage is applied to cause the ionization of the inhomogeneities in the insulation and consequent creation of electrical disturbances, the electrical characteristics of the condenser formed by the cable conductor and sheath with the insulation under stress interposed therebetween have been found to be changed by an amount which, although small, is sufficiently great to be useful in the determination of and location of the inhomogeneity in the insulation.

Knowing that the presence of the inhomogeneities in the insulation thus affects the dielectric constant of the cable lengths, we place a standing wave of high frequency current of uniform amplitude upon the cable length and measure the changes made in that wave produced by the electrical disturbances created at the inhomogeneity in the cable. Obviously if the source of these electrical disturbances is located at a nodal point in the standing wave, the effect of the disturbances on the wave is different than if the inhomogeneity, and consequently the source of the electrical disturbances, occurs at a peak or antinodal point of the standing wave. Thus, by impressing a standing wave of known length upon one end of the cable and thereby producing a nodal point at a known location in the cable, and then repeating the application of that wave from the opposite end of the cable to produce a nodal point at the same or in a different location in the cable sections, the effects of the currents generated by the weak spot in the cable upon the standing wave can be measured and compared, and from the maxima and minima readings thus taken the location of the incipient fault can be accurately determined.

In one embodiment of our invention, we have provided apparatus for impressing a standing wave upon the insulation of a cable section or upon any other insulating medium, so as to determine the position of an incipient fault in that medium, the apparatus being sufficiently delicate to permit the location of such faults when they are so small as to produce no visible or audible effects detectable by prior art devices, thereby enabling us to determine the presence of these tiny faults while they are still so small as to be untroublesome.

In the application of standing waves to a cable section it was observed that the wave shape and amplitude of the standing wave was altered not only by the mere presence of the fault at a nodal or anti-nodal point in the cable but, also, by some other means which were determined to be high frequency waves generated by the fault itself and superimposed upon the standing or carrier wave to modulate it. That is, when sufficient potential is applied to an insulating medium to cause the ionization of the inhomogeneous particles in that medium, this ionization assumes the form of a generator of high frequency electrical waves which traverse a circuit in the cable and which can be employed to determine the presence and location of such a fault in the cable. Because of this, in many instances it is advantageous to omit the application of standing wave to the cable length and to supply suitable arrangement to amplify and detect disturbances by indicating an approaching danger through the waves generated by the incipient fault itself, the data thus taken being employed to determine first, that the voltage is approaching a practical limit, secondly, that there is an incipient fault in the cable and, thirdly, the location of that incipient fault in the cable section.

Our invention therefore includes the application of oscillations and standing waves to a cable or other similar insulating medium to determine the limiting voltage, the presence of and position of inhomogeneities in the insulating medium, and also the determination of the presence and position of such inhomogeneities by means actuated solely by the alternating currents generated by the inhomogeneities themselves.

The method of our invention, while primarily devised for the testing of the insulation of cables and conductors, is not limited thereto, as it may be applied to testing of insulation in any form, as will hereinafter appear.

Nor are the methods and means of our invention limited to the detection and measurement of high frequencies, but to all kinds of disturbances accruing in a dielectric like pulses, surges, transients, traveling waves, harmonics and all forms of current variations, including frequencies from the lowest to the highest.

In the nomenclature of a cable engineer, the term "fault" is practically synonymous with breakdown or rupture of the insulation, or at least has come to mean the existence of conditions which make the time of breakdown most imminent if stressing of the insulation by its working voltage is continued. "Weak spot" is a term similarly used to designate the location of such fault. Obviously, when insulation trouble has developed to such an advanced stage as to come within the terminology of the cable engineer, a simple device, such as a listening stick, may be used for locating the trouble.

For the purposes of our invention, and as used in this specification, a fault is in reality an incipient fault, a condition that is microscopic in comparison with the common understanding of the term. These incipient faults may grow into the more commonplace faults under the influence of electrical stress. From the data taken with the devices of our invention, an estimation of the time that will be required for this development can be more accurately made than has been possible heretofore. The spots at which these incipient faults are located are the weak spots within the meaning of our invention, and the term is not intended to convey any meaning as to the magnitude or seriousness of the fault development. Incipient faults are not necessarily inhomogeneities in the insulation, or at least perceptible inhomogeneities, as certain insulation media set up disturbances, similar to those set up by an inhomogeneity, when subjected to electrical stress, and from this fact it is apparent that there exists a weak spot even though the dielectric is homogeneous in so far as can be ascertained.

As will presently appear, the apparatus of our invention can be made sufficiently sensitive to detect and measure very small electrical disturbances in insulating materials, and it is therefore adaptable for use in a general study of such materials to determine not only what a particular sample of material can do and withstand, but also why it can do it in its own characteristic manner. The invention is therefore serviceable in both theoretical and practical studies of insulation and insulating materials.

Throughout our specification we have used the term "high frequency" in a rather broad sense. The term as used includes not only the higher audible and super-audible frequencies usually designated by it but also includes the lower audible frequencies. The term may be considered as including all frequencies from 100 cycles upward. Ordinarily the applied voltages used in the practice of our invention will be either direct current or 25 or 60 cycle alternating current, and the frequencies of 100 cycles and upward are high with respect to this test voltage.

While the apparatus of our invention herein disclosed is operable over the above range of frequencies, it is particularly adaptable for use with frequencies appearing in the upper part of its range. The copending application of Paine, Brown and Tykociner, Serial No. 504,046, filed Dec. 22, 1930, shows a modified form of our invention which is most aptly used on frequencies from 100 cycles to about 10,000 cycles.

Now to acquaint those skilled in the art with the teachings of our invention, reference is here made to the accompanying drawings in which a preferred embodiment of it is shown by way of example and in which:

Figure 5 shows the application of the circuit of Figure 3 to the testing of a cable section.

Figure 6 shows a modified form of cable testing apparatus, particularly adapted for use as a semi-portable apparatus;

Figure 7 shows the apparatus for calibrating and testing the insulation test apparatus;

Figure 8 shows the application of our invention to the testing of strip insulating;

Figure 9 shows a circuit arrangement by which a surge in a cable can first be detected and then the fault causing it can be located;

Figure 10 is a graph illustrating the locating of a fault by the circuit of Figure 9;

Figure 11 shows a modified form of the test circuit shown in Figure 9;

Figure 12 shows the circuit arrangement of an embodiment of our invention which provides for direct indication of the location of a fault in a cable; and Figure 13 shows the construction of an artificial source of ionization used in the practice of our invention.

Figure 1:
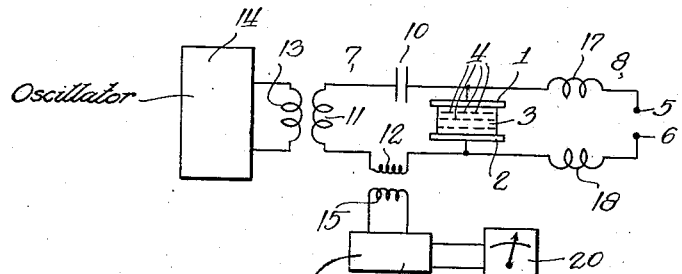
Figure 1 is a schematic circuit diagram illustrating the apparatus by which ionization currents are superimposed upon a carrier wave to modulate it.
Figure 2:
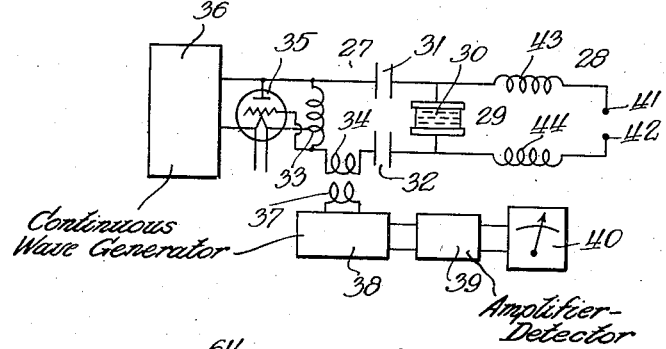
Figure 2 is a similar diagram illustrating the utilization of the effects produced by changes in dielectric constant resulting from ionization to alter the frequency of an oscillating system in which the sample is included.
Figure 3:
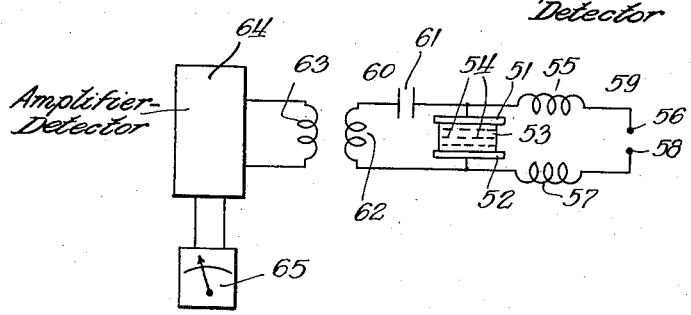
Figure 3 is a circuit diagram of the apparatus employed to utilize the high frequency waves generated by the ionization as a means for detecting and locating that ionization.

Referring to the drawings now in more detail, Figures 1, 2, and 3 represent by the usual circuit symbols the fundamental conceptions of our invention.

The sample under test is represented by plates 1 and 2 separated by an insulating medium 3 which is shown to contain a plurality of spots or inhomogeneities 4. The plates 1 and 2 may be the plates of a condenser, the conductor and shield of a cable section, or the electrodes of a test setup, and the insulating media 3 may be the dielectric or insulation of the cable or condenser or bulk insulation such as oil.

It has been observed that if the terminals 5 and 6 are connected to a source of potential, which may be either alternating current or direct current, to impress a potential difference between the plates 1 and 2, when a particular potential difference is reached the inhomogeneities 4 in the dielectric begin to ionize and break down. For example, if the spots 4 are gas bubbles in an oil dielectric, when this critical voltage is reached they will disappear suddenly from the oil as pure dielectrics and will reappear as small semiconductive bodies. Obviously, this disappearance and reappearance of the gas bubble dielectrics in the oil causes a redistribution of electrical forces in the oil and, as a result of this change in the dielectric of the condenser formed between plates 1 and 2, the capacity of the condenser will be changed correspondingly. It is this sudden change in capacity accompanying the redistribution of the electrical forces in the dielectric that is employed to determine the presence of the gas bubbles 4. Actually, of course, the bubbles 4 are so small as to be practically invisible to the naked eye, yet the apparatus shown is capable of detecting the changes in capacity between plates 1 and 2 when the electrical forces in the dielectric 3 are redistributed as a result of the ionization of these minute particles of gas.

To accomplish this, the condenser consisting of plates 1, 2 and the dielectric 3 is included as a part of a high frequency circuit indicated generally at 7, as well as a part of the low frequency or direct current circuit indicated generally at 8. The high frequency circuit consists of a condenser 10 of small capacity, preferably an air condenser or a condenser having a high-grade dielectric, so that the capacity between its plates is fixed and is in itself not subject to breakdown during the ionization of the dielectric in the test condenser 3. The high frequency circuit 7 also includes inductances 11 and 12, inductance 11 serving in conjunction with the inductance 13 to couple the circuit to an oscillator 14. The inductance 12 and its companion inductance 15 couple the high frequency circuit 7 to a detecting and amplifying means 16 for a purpose which will presently appear.

With the terminals 5 and 6 disconnected from the source of potential, not shown, the oscillator 14 is started to drive a current of known frequency and amplitude to the oscillating circuit 7. Preferably, the oscillator 14 is a thermionic continuous wave generator of any preferred type capable of driving high frequency current through the coil 13 connected to its output terminals, to thereby induce a corresponding frequency in the high frequency circuit 7, which is coupled to the oscillator by the coupling between inductances 13 and 11. This circuit includes the inductances 11 and 12, the condenser consisting of plates 1 and 2, and the condenser 10 in series. The circuit therefore has a fundamental frequency at which maximum amplitude of oscillations will be obtained for a given potential induced in the winding 11. After this circuit has been energized for a sufficient length of time to permit the oscillation generator 14 to become sufficiently warmed up to be stable, the terminals 5 and 6 are connected to a source of high potential current which is either a direct current or low frequency alternating current, an alternating current of 60 cycles being suitable for this purpose. In order to isolate the high frequency current traversing the circuit 7 from the source of energizing potential connected to the terminals 5 and 6, we have interposed inductances 17 and 18 which serve as choke or impedance coils and afford a very high impedance to the high frequency current in the circuit 7 and a much lower impedance to the low frequency current impressed upon the circuit 8 by the source of potential, not shown.

As soon as the oscillator 14 is started and the circuit 7 energized by a high frequency current, the coupling between the inductances 12 and 15, causes the inductance 12 to induce a potential in the circuit closed through the inductance 15 thereby creating a potential difference across the terminals of the inductance 15, this potential difference being alternating and of frequency corresponding to the frequency of the generator 14. The inductance 15 serves as a pick-up winding for the amplifier and detector unit 16, this unit consisting of any preferred type of high or so called radio frequency amplifier and suitable detecting means for converting this high frequency current into a low frequency current so that the lower frequency current may be employed to drive the indicator 20 which is connected to the output of the amplifier detector unit 16. If desired, the unit 16 may consist of a standard radio set comprising radio frequency amplifiers, detectors, and audio frequency amplifiers. The indicator may be of the thermoelectric or thermionic voltmeter type directly responding to high frequency, or of the rectifier type.

With the low frequency circuit 8 deenergized and the high frequency circuit 7 energized, the indicator 20 is caused to give a deflection which is readable, although small. When the source of energizing potential is connected across the terminals 5 and 6 and a voltage is applied to the plates 1 and 2 of the test sample, the deflection of the indicator 20 is increased, this deflection becoming larger and larger as the potential difference across the terminals 5 and 6 is increased. Shortly before distinct signs of ionization are detected, disturbances in the form of complex harmonics may be measured by means of the unit 16 and the indicator 20. They respond if tuned either to the fundamental frequency of circuit 7 or to a higher harmonic. By the use of many stages of aperiodic amplification, disturbances having a frequency corresponding to the charging current and its harmonics are detected. When the voltage is sufficiently high to cause ionization of the inhomogeneities 4 in the dielectric 3, the capacity of the condenser formed by the plates 1 and 2 and the dielectric 3 will be changed and, as a result, the natural period of the high frequency circuit 7 will be changed and will no longer correspond to the frequency generated by the continuous wave generator 14. As a result of this detuning of the coupling circuit 7, the deflection of the indicator 20 will be decreased, since the current flowing in the coil 12 is decreased and, consequently, the potential difference across the terminals of the pick-up coil 15 of the amplifier unit 16 will be decreased. By noting the value of potential applied to the terminals 5 and 6, the potential at which ionization of the dielectric begins can be determined. If the amplifier and detector unit 16 is made sufficiently sensitive, the decrease in the deflection of the indicator 20 will occur long before the ionization has become sufficiently pronounced to be visible or audible with ordinary receiving devices. If the voltage across the terminals 5 and 6 is increased sufficiently above the point at which ionization sets in, a corona effect between the plates 1 and 2 will be observed and the alteration of the capacity of the condenser formed by plates 1 and 2 of the dielectric 3 will be so great as to cause a very great decrease in the deflection of the indicator 20. It will therefore be seen that the arrangement in Figure 1 detects the presence of ionization of the dielectric by changes in current flow in a tuned circuit which are produced by changes in capacity of a condenser of which the dielectric forms a part.

In the arrangement shown in Figure 2, the ionization of the dielectric is detected by a change in frequency of an oscillating circuit in which the condenser formed with the dielectric under test is included. In this arrangement, the oscillating circuit 27 and low frequency energizing circuit 28 are common to the test sample 29 in which the ionization of the dielectric 30 is to take place. The oscillating circuit 27 includes condensers 31 and 32 and inductances 33 and 34, the inductance 33 being part of an oscillating circuit including the thermionic tube 35. A continuous wave generator 36, of which the thermionic valve 35 forms a part, energizes the oscillating circuit 27 with current of definite frequency and amplitude, as before. Since the oscillating circuit 27, whose characteristic is to be changed by the variations in the condenser 29 produced by the ionization of the inhomogeneities in the dielectric 30, is a part of the oscillating circuit of the continuous wave generator 36, variations in the condenser 29 will produce a corresponding variation in the frequency of the oscillations. The inductance 34 forms with the inductance 37 a coupling transformer by which another continuous wave generator 38 is coupled to the oscillating circuit 27. The continuous wave generator 38 is coupled also to the input of the amplifier detector unit 39 whose output circuit is connected to an indicator 40. The operation of the circuits of Figure 2 is as follows: The continuous wave generator 36 is tuned with the terminals 41 and 42 disconnected from the constant test potential source, not shown, and the generator 36 and generator 38 are tuned, so that they are oscillating at the same frequency and at constant amplitude. The amplifier detector unit 39 is adjusted so that it produces a definite minimum deflection of the indicator 40 at this frequency. After the oscillators have been run sufficiently long to be warmed up and to become thoroughly constant in their operation, the terminals 41 and 42 are connected to a constant test potential which imposes a potential difference across the plates of the test condenser 29. As the voltage thus applied to the test plate is increased, ionization sets in and the frequency at which the continuous wave generator 36 is oscillating will be altered with a result that the generator 38 will be caused to produce beat notes with the fundamental frequency of the generator 36. These beat notes are picked up and amplified by the unit 39 and, since the units 39 and 40 are sensitive to the pulses in proportion to their number, the deflection of the indicator will increase sharply, thereby indicating the beginning of ionization of the dielectric 30. As in the circuit of Figure 1, this deflection of the indicator 40 occurs when the potential applied to terminals 41 and 42 is so low that no visible corona is produced in the dielectric, and if this potential is increased sufficiently to produce a visible corona in the dielectric a corresponding increase in the deflection of the indicator 40 results from the greater beat note frequency of the generators 36 and 38. We have provided inductances 43 and 44 which serve as chokes to prevent the high frequency current from the alternator 36 from traversing the energizing circuit connected to terminals 41 and 42. The condensers 31 and 32 which are in the high frequency circuit are of such capacity that they prevent the low frequency or direct current from the source connecting the terminals 41 and 42 from traversing the high frequency circuit 27. If, instead of a constant test potential, the terminals 41 and 42 are connected to a source of alternating high voltage, the beat producing oscillator 38 may be omitted and detecting and measuring units like 16 and 20 of Figure 1 may be used instead.

It will be noted that the circuits included in Figure 1 and Figure 2 impress upon the test plates 1 and 2 a wave of high frequency alternating current. In case the plates 1 and 2 are the conductor and sheath of a cable length, this alternating current produces standing waves in the cable by means of which the location of the inhomogeneity 4 in the dielectric 3 can be located in a manner which will be hereinafter explained. If the plates 1 and 2 are condenser plates and are relatively short in comparison with the distance between them, that is, the thickness of the dielectric, the standing wave phenomena is of course of negligible value.

In the circuit in Figure 3 a slightly different principle is employed to detect the presence of ionization of inhomogeneities in the dielectric. In this circuit, the test plates 51 and 52 have dielectric 53 interposed between them, and in th's dielectric are inhomogeneous spots 54. The plate 51 is connected through an inductance 55 to the terminal 56, and plate 52 through an inductance 57 to the terminal 58, these terminals being adapted to be connected to a source of test current which may be either alternating current of about 60 cycles frequency or direct current. The circuit extending from test terminal 56 through the inductance 55, the plate 51, dielectric 53, plate 52 and inductance 57 to the terminal 58 comprises the low frequency circuit indicated generally at 59. A high frequency circuit 60 is also connected to the plates 51 and 52, and comprises a condenser 61 and inductance 62 serially connected between these plates. An inductance 63 which serves as a pick-up coil for the amplifier and detector 64 is electromagnetically coupled to the inductance 62, and the output of the amplifier and detector unit 64 is connected to an indicator 65.

In the operation of this circuit the amplifier unit 64 is tuned to respond to a particular fundamental frequency and the high frequency circuit 60 is likewise tuned to th's particular frequency. High voltage to the terminals 56 and 58 set up electrical stresses in the dielectric 53 and as this voltage is increased the stresses are increased until ionization of the inhomogeneities 54 eventually takes place. The redistribution of electrical stresses in the dielectric occasioned by this ionization of the inhomogene'ty produces in the high frequency circuit 60 an electrical disturbance, which is picked up by the amplifier and detector through the coupling of the inductances 62 and 63 and therein ampl'fied and detected, is made to cause the indicator 65 to deflect its pointer. In other words, the circuit in Figure 3 makes use of the electrical disturbances generated by the ionization of the particles in the dielectric, that is, the phenomenon that the circuit is arranged to detect is made the driver, and the apparatus in the circuit is merely a receiving apparatus for detecting and amplifying the current generated by the ionization of the inhomogeneous particles in the dielectric. No standing waves are employed in this circuit. Since the apparatus included in it is relatively more simple than that in the circuit of Figures 1 and 2, the arrangement in Figure 3 is particularly adapted to detect the presence of inhomogeneities rather than to locate them within the cable length, although, as will presently appear, the principle of operation of the circuit in Figure 3 can be employed to locate, as well as detect, the presence of these inhomogeneities. By making the amplifier detector unit 64 of sufficient sens'tivity, the ionization of inhomogeneous particles 54 in the dielectric 53 can be detected by the circuit arrangement in Figure 3 when the voltage applied to the terminals 56 and 58 is too low to produce a visible corona, and the circuit of Figure 3 is therefore capable of detecting the very beginning of ionization of a dielectric.

In describing the operation of the circuit of Figure 3 the conditions in this circuit were, for the sake of simplicity, assumed to be of such a character that preferably high frequency oscillations will be excited by ionization. It may be noted that our invention includes in principle the use of the entire range of frequencies and of all forms of disturbances which may be excited by potentials applied to dielectrics. We have found that audible frequencies and high frequencies from 100 to 20,000 kilocycles are of practical value for cable and condenser testing. We can choose any of these frequencies or types of current variation by proper adjustment of the constants of our circuit. On the other hand, we have observed types of current variations which are independent of the circuit constants and are inherent to the dielectric itself. In both cases, aperiodic disturbances as well as oscillating current variations of distinct periodicity could be made use of for testing purposes. A great number of experiments and investigations we made led us to the following generalizations.

Every change in the dielectric, whether due to a local rearrangement of molecules or to a gas bubble becoming ionized, produces a pulse. The sum of all pulses results in complex varying currents. The constants and linear dimensions of the circuit determines the final form of the current excited by the changes. If the circuit is aperiodic and reflections cannot take place while a pulse is traveling, the current variation will be in the form of distinct pulses. If, however, the circuit has a pronounced frequency of its own, the current will assume the particular frequency given by its constants. By choosing proper magnitudes of capacities and inductances, current variations of any frequency, not necessarily high frequencies, may be obtained. Circuits extended in space, like cables and transmission lines in which pulses may be reflected from one or both ends, give rise to standing waves.

Returning to the operation of the circuit of Figure 3, it is now evident that, in all cases above enumerated, the receiver 64 can be made to respond to the variations of current produced in circuit 60 by the changes in the dielectric. The constants of the circuit 60 can be chosen so as to produce an audible frequency whenever ionization or other change sets in in the dielectric. For the case of audio frequencies 64 would represent an audio frequency amplifier and 65 a loud speaker or a pointer instrument connected with thermocouples.

Besides the frequencies which are determined by the constants of the cable circuit and the harmonics inherent to the dielectric, there are still other causes of periodic variations. One of them is given by the frequency of the applied voltage, and the other is given by the number of ionization pulses within each half cycle of the applied voltage. It may be noted that we are making use also of these "group" frequencies. Because they modulate the higher frequencies, they may be heard, after detection, by means of loud speakers.

Figure 4:
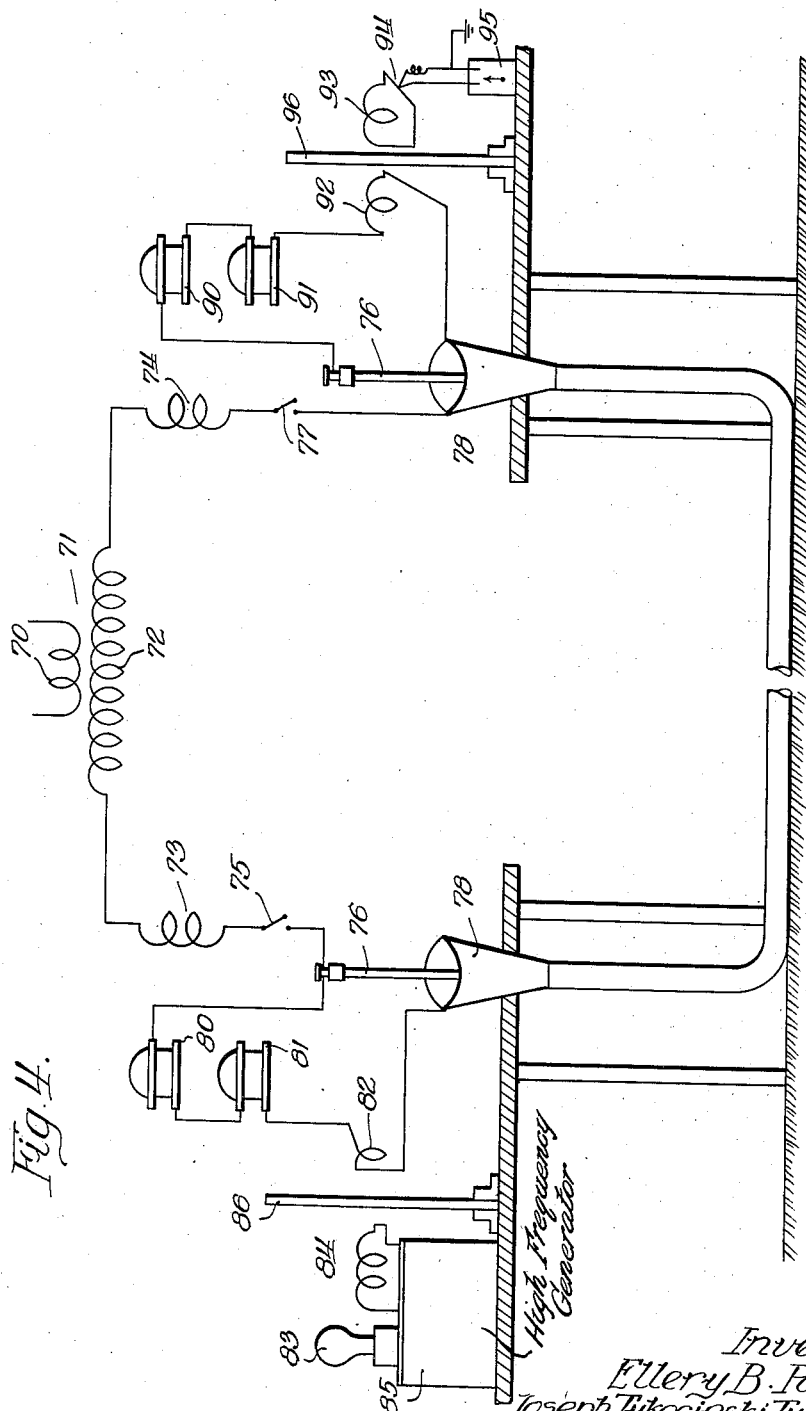
Figure 4 shows the application of the circuit of Figure 1 to the testing of a cable section.

The circuits shown in Figures 1, 2 and 3 are merely schematic diagrams illustrating the principles involved in the testing apparatus of our invention. In Figure 4 is shown an application of the principle involved in the circuit of Figure 1 to the testing of a cable link. In this figure, the terminals of the primary winding 70 of the supply transformer 71 are connected to a suitable source of variable voltage constant frequency current, preferably of a frequency of 60 cycles. The secondary winding 72 is connected at one end to the choke 73 and at the opposite end to the choke 74, these chokes corresponding to chokes 17 and 18 of Figure 1 and serving to prevent the high frequency current from traversing the path of the low frequency currents.

The choke coil 73 is connected through a suitable switch 75 to the conductor 76 of the cable under test, and, similarly, the choke 74 is connected through a suitable switch 77 to the cable sheath 78. Switches 75 and 77 are preferably air-break switches suitably insulated to withstand the test voltage under which the system is working.

At one end of the cable, condensers 80 and 81 and the inductance coil 82 are serially connected between the conductor 76 and the cable sheath 78 to constitute a part of the high frequency circuit. The condensers 80 and 81 are either air condensers or oil filled condensers capable of withstanding the high voltage applied to the circuit by transformer 71, and are of small capacity so that they prevent the passage of the low frequency charging current from the source 71 through the high frequency circuit.

A high frequency generator 85, including the thermionic device 83 and inductance 84, is positioned adjacent the coil 82 so that the coil 84 is coupled thereto and the output of the generator 85 is thereby impressed upon the high frequency circuit through the cable. A suitable insulating member 86, which may be of glass or any other suitable substance, is interposed between the coils 82 and 84 to guard against the possibility of the charging voltage from transformer 71 being impressed upon the high frequency oscillator 85.

At the opposite end of the cable, condensers 90 and 91 and an inductance 92 are connected between the conductor 76 and the cable sheath 78 to complete the high frequency circuit.

The detecting device, diagrammatically represented by the inductance 93, the thermo-couple 94 and the indicator 95, serves to indicate the high frequency current picked up from the high frequency circuit through the cable under test. An insulating member 96 is interposed between coils 92 and 93 to guard the receiving apparatus from the high potential of the charging current from transformer 71.

From the circuit in Figure 4 it will be seen that the condenser 10 of Figure 1 is divided into four units consisting of condensers 80, 81, 90 and 91, and that the inductance 82 corresponds to the inductance 11 of Figure 1 and the inductance 92 to the inductance 12 of Figure 1. As shown, no amplifier is interposed between the thermocouple 94 and the indicator 95, it being obvious that if conditions require it, a suitable thermionic amplifier may be interposed to amplify the current picked up by the coil 93 from the high frequency circuit through the cable under test. The operation of the circuit in Figure 4 is the same as has been hereinbefore explained for Figure 1, that is, the oscillator 85 is warmed up to transmit a constant frequency current through the high frequency circuit and is tuned to cause the frequency of that current to correspond to the frequency for which the inductances 82 and 92 and condensers 80, 81, 90 and 91 are tuned. After the generator 85 has been properly set, switches 75 and 77 are closed, and the voltage supplied to the primary winding 70 of the transformer 71 is raised gradually until ionization begins in the insulation interposed between the conductor 76 and cable sheath 78 of the sample under test. The deflection of the indicator 95 decreases when ionization begins, for the reason which has hereinbefore been pointed out, and by noting the voltage applied to the transformer 71 the ionization potential of the insulation under test is definitely known.

The high frequency wave set up in the circuit through the cable by the generator 85 is a standing wave of known length. By test or by computation from the constants of the circuit, the nodal point or points of this wave can be determined. While for detecting insidious faults a large range of wave lengths may be used by adjusting the values of the capacity and inductance of the circuits adjacent both cable ends, the best condition for locating weak spots requires a wave length corresponding to the natural frequency and to the harmonics of the tested cable length, so that ¼, 2/4, ¾, etc. of a standing wave is established along the cable, with its nodal and antinodal zones.

By noting the amount of the change in the reading of indicator 95 when ionization sets in, as explained above, and also noting the position of the nodal point of the wave and the voltage applied from transformer 71, one set of readings are completed. The position of the nodal point is then shifted to another known position by suitable adjustment of the higher frequency circuit and of generator 85, this change being made without altering any of the other conditions impressed on the sample. Readings are again taken and the proceeding repeated. Since the effect of the ionization is least when the fault occurs at a nodal point, the location of that point when a minimum change of the indicator 95 is noted is the location of the fault. If there is more than one fault in which the ionization occurs with the voltage used, a corresponding number of equally small changes will be noted, and thus the faults may all be located. With accurate adjusting devices for the generator 85, the distance that the nodal point is shifted can be made small, and the fault can therefore be accurately located.

As shown, the cable sample and testing equipment are arranged in a convenient framework which supports the ends of the cable adjacent the testing equipment, this arrangement being an arbitrary one shown by way of example only and being capable of great modification within the teachings of our invention.

The circuit arrangement of Figure 2 may be similarly applied to the cable sample, the method of application being practically the same as that shown in Figure 4 modified, of course, to include the cable conductor and cable sheaths as two plates in the oscillating circuit itself, rather than in a separate closed high frequency circuit as shown in Figure 4. The circuit modifications for accomplishing this result will be apparent to those skilled in the art and have been omitted from the drawings, since their inclusion would be a mere repetition amounting to an unnecessary complication of the drawings.

In Figure 5, we have shown the application of the circuit arrangement of Figure 3 to the testing of a cable sample. In this figure, the primary winding 100 of the transformer 101 is connected to a suitable source of test voltage of 60 cycle frequency, this source not being shown, and the secondary winding 102 of this transformer is connected through impedances 103 and 104, respectively, to the conductor 105 and the cable sheath 106 of the sample under test. A high frequency circuit is included and consists of the resistance R1, the condenser 107 and inductance 108 serially connected between the conductor 105 and cable sheath 106 of the sample, and also a similar resistance R2, condenser 109 and inductance 110 similarly connected at the opposite end of the sample. Inductance 111 is coupled to the inductance 108 and conducted through leads to terminals 112 and 113 of the double pole double throw switch 113', and inductance 114 is coupled to the inductance 110 and similarly connected to terminals 115 and 116 of this switch.

In the circuit arrangement of Figure 5 the cable sheath 106 is grounded at 117, and static drains 118 and 119 are connected to the lead wires from the coil 111. Similar drains, 120 and 121, are connected to the leads of coil 114, these drains draining off extraneous disturbances from the circuit to thereby render the operation of the test more uniformly satisfactory.

Suitable switches may be interposed between the terminals of the transformer 102 and the test sample; however, these have been omitted from the drawings to avoid undue complexity in the illustration.

The operation of the circuit of Figure 5 depends on the constants of the cable and of that of the adjacent circuits. Three characteristic conditions may be distinguished:

a. The circuit has a resistance, inserted at one or at both ends of the cable as indicated by R, and equivalent to the surge line resistance we may call also wave resistance. Then a disturbance due to ionization or to any other change in the dielectric in a certain point of the cable will travel simultaneously towards both ends without reflection and with attenuations depending on the relative distance of the source from the respective cable ends.

b. The circuit has no special resistances preventing reflections and the inductances and condensers at each end of the cables are so chosen that the cable, when excited by a disturbance, builds up a standing wave of a quarter wave length. Then the amplitude of the standing wave depends on the location of the source in respect to the nodal and antinodal points.

c. The inductances and condensers at each end of the cable are very large so that the frequency of the oscillations excited by a disturbance in the cable produces much longer waves than those corresponding to the geometrical length of the cable. Then, the voltage and current distribution along the cable being uniform, there will be no difference in the intensities of the excited oscillations, whether measured at one or the other end of the cable.

We will consider case a first and will describe cases b and c later in connection with Figures 9 and 10.

In the operation of the circuit of Figure 5, the transformer 101 is energized from constant frequency current, preferably 60 cycle, and the voltage applied to the winding 100 is increased until the ionization voltage of the dielectric in the cable sample is reached. The knife switch 113' is thrown to one or the other of its positions, say for example, to the position in which it engages terminals 112 and 113, and the disturbances created by the ionization of the dielectric cause a potential fluctuation in the coil 111 which is transferred by coil 122 to the pickup coil 123 of the amplifier detector unit 124. A sound producing means such as the loud speaker 125 is connected to the output of the amplifier unit 124 and when ionization of the dielectric begins a crackling sound will be heard in the loud speaker. The knife switch 115' may then be thrown to its opposite position engaging the terminals 115 and 116 to thereby connect the coil 122 to the coil 114.

Obviously, if the ionization of the dielectric of the sample occurs at a point equidistant from the two terminal ends of the cable, the disturbance picked up by the coils 110 and 114 will be equal. Also, if the disturbance occurs nearer one end of the sample, say nearer the end with which the coil 110 is associated, the disturbance picked up by the coil 122, when connected to the coil 110, will be smaller than that picked up when the coil 122 is connected to the coil 114. By suitable computations made from the known characteristics of the cable and especially from its attenuation factor, the distance from the ends of the cable at which the disturbance occurs can be determined with the apparatus shown. Preferably, of course, when the location of the fault is sought, the loud speaker 125 will be replaced by a suitable indicating instrument so that the relative values of current picked up by the coil 122 can be more easily determined. By this arrangement the voltage at which ionization occurs can be determined, and the position of the ionization can also be determined. A large range of audible and high frequencies can be used for this purpose. The arrangement of Figure 5 is advantageous in that it can be operated successfully with a grounded cable sheath, thereby rendering it applicable to testing cable lengths that are installed in conduits in the ground, under which condition the cable sheaths, of course, are grounded.

In the circuit shown in Figures 1 to 5, inclusive, the amplifier and detector units employed are very sensitive. To avoid the possibility of errors in the indications of the indicators, due to extraneous disturbance picked up either through the cable itself or through the amplifying and detecting apparatus, we propose to make judicious use of shielding of this apparatus.

In Figure 6 we have shown a modified adaptation of our invention including the shield to be used with it. In this modification, the detecting arrangement is connected only to one end of the cable length, and ionization of the dielectric is determined by surges in the charging current. An aperiodic circuit is interposed between the cable equipment and the amplifier and detector unit to assist in this performance.

In Figure 6, the primary winding 130 of the transformer 131 is adapted to be connected to the source of variable voltage constant frequency alternating current, and the secondary winding 132 has one of its terminals connected to ground at 133 and the other terminal to the conductor 134 of the cable length 135 which is under test. The cable sheath of this cable is grounded by suitable means, not shown. The high frequency circuit 136 consists of condensers 137 and 138 and the inductance 139, all serially connected between the conductor 134 and the sheath of the cable 135. The condensers 137 and 138 are small capacity condensers capable of withstanding the high potentials used during the testing operation.

The inductance 139 is coupled to an inductance 140 whose terminal ends are connected by shielded conductors 141 and 142 to the one winding 143 of the variometer 144, with a resistance 145 connected between these conductors and having its mid point connected to ground at 145. Shielding members 147 and 148 encase the conductors 142, the resistance 145 and the variometer 144. The secondary winding 149 of the variometer is connected to a shielded amplifier unit 150. Preferably, the amplifier unit 150 is a commercial radio receiving set of the heterodyning variety commercially known as a superheterodyne, which in itself is suitably shielded by the shielding members 151. The coupling of the superheterodyne to the aperiodic circuit including coils 140 and 143 can be varied by varying the adjustment of the variometer 144. The output side of the superheterodyne is connected to a suitable audio frequency amplifier 152, and the output of this amplifier is connected to a transformer 153 through its primary winding 154. The secondary winding 155 of this transformer is connected to a suitable indicating instrument 156, which may be a milliammeter or voltmeter, preferably capable of giving accurate readings on rather high frequencies. If desired, an additional secondary winding 157 may be included on the core of the transformer 153 and a loud speaker or other suitable audible device connected to the terminal ends of this winding, so that the disturbances in the cable may be made audible simultaneously with the taking of measurements upon them by the indicator 156.

It will be seen that the operation of the circuit arrangement of Figure 6 is similar to that which has been clearly explained and that detailed explanation is not necessary. The surges produced in the charging current supplied to the cable section by the transformer 131 are picked up through the aperiodic circuit and amplified and detected by the radio set and amplifier, and made to actuate the indicator which measures the seriousness of the ionization as a function of the voltage applied by the transformer 131.

In this, like in all previously described cases, the application of commercial radio receivers was indicated. However, any arrangement capable of detecting pulses, surges, oscillations, harmonics, traveling waves, modulated continuous waves or alternating current variations of the required frequency will serve the purpose. It is not necessary to use in all cases detectors with this circuit, because, in most cases, surges and oscillations can be measured directly without the aid of detectors. Detectors are needed whenever we wish to have an acoustic indication of ionization while the disturbances in the dielectric are of the high frequency type.

In Figure 7, we show the diagram of a circuit similar to that shown in Figure 6 and which is particularly useful for calibration and test work in cable research. The cable 160 is a relatively short length of standard high voltage cable in the insulation and sheath of which have been cut a number of openings 161 to expose the conductor, and through which the terminals of an artificial source of ionization may be extended so that the performance of the testing equipment may be studied under various conditions of faults.

We have found that a disc made of lithographic stone or of other suitable semi-conductive material, placed between electrodes and connected to a source of constant or variable potential, will produce a condition of unequilibrium in such a dielectric calling forth electrical effects implicating the ionization phenomena in cables and condensers.

A source of ionization of this kind may be used as an independent source of electrical oscillations. In connection with cable testing it may be used as a standard for the determination of the amount of ionization.

Figure 13 illustrates the use of an artificial source of ionization for the purpose of studying the influence of shifting the point of localized ionization along a standard test cable. This source comprises a disc 162 of lithographic stone, which is held in engagement with the clamping disc 162' by a sharpened cup electrode 163. The disc 162' is mounted on a suitable block of insulating material 165 which carries also the U-strap 165' through which the adjusting screw 166 is threaded. A spring washer 166' is interposed between the end of the screw 166 and the cup electrode 163 to insure that the pressure placed on the electrode will be uniformly distributed. The insulating base 165 also carries a second U-strap 165" by which the assembly is clamped to the cable 160.

The clamping electrode 162' carries a needle point 162" which projects through an insulating bushing 160' set in the opening 161 in the cable sheath, and into engagement with the conductor 164 of that cable. It will, therefore, be seen that the opposite faces of the disc 162 are connected between the sheath and conductor of the cable, and that disturbances set up in the disc by an application of potential to it will correspond to ionization in the insulation of the cable itself.

In the circuit arrangement shown in Figure 7 the test voltage applied to terminals 167 and 168 is of 60 cycle frequency and is extended through inductances to the conductor 164 of the cable and also through the inductances 170 and 171 to the grounded sheath 172 of the cable. Condensers 173 and 174 are connected across the terminals 167 and 168 on the cable side of the inductances 169 and 170, these condensers and inductances serving to filter out of the charging current any ripples or disturbances which would affect the indicating instrument. At the opposite end of the cable length the conductor 163 is connected through condensers 175 and 176 and the inductance 177 in series to the cable sheath 172. These two systems of condensers and inductances constitute the high frequency circuit through which the surges or pulses generated in the lithographic stone 162 are made to travel.

The inductance 171 is coupled electromagnetically to the inductance 178 which is connected between the grid and filament of the thermionic tube 179, this tube in turn being connected to the input of a radio set 180. The receiver 180 contains a plurality of stages of radio frequency amplification, the last one of which is passed through thermo-couple 181 which leads to an indicator 182, so that the intensity of the high frequency disturbances can be measured quantitatively prior to their rectification and low frequency amplification by the device. The detector unit 181 is also coupled to the output of the radio frequency amplifier 183 to rectify these high frequency surge currents and deliver them to an audio frequency amplifier 184 whose output 185 is connected to a double pole double throw switch 186. A loud speaker 187 or other suitable audible device is connected to one set of terminals of the switch 186, and a transformer unit 188 is connected to the other set of terminals.

This transformer unit 188 consists of three separate iron core transformers, 189, 190 and 191, whose primary windings are connected in multiple, and whose secondary windings are connected in series and closed through the indicating device 192. By this arrangement the intensity of the disturbances can be measured both before and after amplification, and the calibration of the radio amplifying and detecting devices used in this work can thereby be checked and noted.

Our invention, while primarily concerned with insulation which has been installed in a condenser or cable or the like, is also applicable for the detection of small inhomogeneities in insulation which has not as yet been so installed. To this end, the circuit in Figure 8 has been devised. In this circuit the testing source of 60 cycle alternating current is connected to terminals 200 and 201, which are in turn connected to the primary winding 202 of the transformer 203 with condensers 204 and 205 connected across this winding and grounded at their mid point 206. These condensers serve to drain off of the supply current any extraneous surges or ripples in the voltage which would affect the readings of the testing equipment. The secondary winding 207 of this transformer 203 is connected to the primary winding 208 of the testing transformer 209, with condensers 210 and 211 connected across the winding 207 and grounded at their mid point 212. The secondary 213 of the test transformer 209 is connected through inductances 214 and 215 to the testing equipment including condenser 216 and test electrodes 217 and 218, grounded, ground being interposed on this electrode 218 at 219. A small condenser 222 is connected around the test electrodes 217 and 218. The insulation to be tested by this device consists of a sheet of paper, insulating fabric or the like, and this sheet 220 is adapted to be pulled between the electrodes 218 and 217 in any preferred manner, such as by an electric motor driving soft rubber rolls which engage and pull the material between the electrodes. By the application of suitable potential to the electrodes 218 and 217 through the transformer and filter equipment connected to terminals 200 and 201, the sample can be placed under electrical stress. The high frequency circuit included in this testing equipment consists of condenser 221, inductance 223, and variable condenser 224 which tunes the circuit to a prescribed frequency. The high frequency circuit output is connected to terminals 225 and 226, which are in turn connected to a high frequency amplifier and detector unit such as, for example, the unit 100 consisting of amplifier 150 and detector 152 shown in Figure 6. Suitable coupling means, such as the variable coupling 144, may be interposed if desired, although this is not essential.

The voltage upon electrodes 217 and 218 causes sudden local changes of the charging current ionization of the weak spots in the insulation 220 which is pulled therebetween, this ionization causing surges or ripples in the current which energize the tuned high frequency circuit that is connected to these electrodes. This actuates the radio frequency amplifier and detector unit, causing the indicating instrument connected thereto to give a readable deflection, thereby quantatively measuring the seriousness of the weak section in the insulation. By this arrangement, long strips of insulating paper, fabric and the like, can be tested at a voltage lower than the breakdown potential prior to its assembly into a device, and the use of a test of this kind insures the employment of uniformly high-grade insulating materials in the fabrication of such devices.

In Figure 9 we have shown an arrangement whereby our invention is applicable for first detecting the presence of surges due to ionization of the dielectric no matter where in the dielectric this ionization takes place and, second, to locate the point at which it takes place. We have discovered that for the purposes of detection of discharge a wave length greater than the natural period of the cable is most satisfactory for use, and for the location of the exact spot along the cable at which the ionization takes place a wave length approximately the natural period of the cable is most satisfactory. In Figure 9, the supply transformer 240 is adapted to have its primary 241 connected to the source of 60 cycle charging current and its secondary 242 has one terminal connected to the cable sheath 243, which is also grounded. The opposite terminal of the secondary winding is connected through inductances 244 and 245 to opposite ends of the conductor 246 of the cable and also to points 247 and 248 of the single pole double throw switch 249. The high frequency circuit is connected to the blade of this single pole double throw switch and comprises the condenser 250, inductance 251 and inductance 252, the latter inductance being adapted to be short circuited by the circuit extending through switch 253. The operation of this switch to short circuit inductance 252 tunes the circuit to respond to short wave currents, and when the switch is opened, to respond to long wave currents. The inductance 252 is connected to ground at 254. A long wave receiver 255 is provided with a pick-up coil 256 which is coupled to the inductance 252, and a short wave receiving set 257 is provided with a pick-up coil 258 coupled to the inductance 251, the latter receiving set having its output circuit coupled through the transformer 259 to the indicator 260. The operation of this circuit is as follows. The double throw single pole switch 249 is thrown to one end of the cable and the supply transformer 240 is energized to bring the voltage impressed upon the cable up to the point at which ionization of the dielectric begins. This is detected by the long wave receiver 255, the switch 253 being opened at the time so that the surges in the high frequency circuit produced by this ionization will energize the pick-up coil 256 and hence produce a voltage difference across the input terminals of this receiver. Since this receiver is not employed for quantatively measuring the surges produced by this ionization, a suitable loud speaker or other audible signal, not shown, may be employed to determine when the surges take place.

When a surge is detected in this manner, the switch 253 is closed and short wave receiver 257 is tuned so that the indicator 260 gives a certain reading which is noted. The knife switch 249 is then thrown to connect the receiving apparatus to the opposite end of the cable and a corresponding reading of the meter 260 is noted. If the weak spot at which ionization is occurring is located at the exact center of the cable section 261, the two readings of the indicator 260 taken with the receiving apparatus connected to opposite ends of the cable will be the same. However, if the fault occurs at some point other than the center the reading from one end of the cable will be greater than the reading from the other end of the cable.

In describing the operation of the circuit of Figure 5 we mentioned three characteristic conditions which occur in a cable. It is the case marked $b$ which is important in connection with the operation of the circuit in Figure 9. Case $b$ requires that there should be no appreciable resistance inserted in the circuit, especially at the cable end, which would prevent a traveling wave from reflection. The inductance coils and condensers at each of the cable ends are so chosen that a disturbance, once existent, builds up by reflections a standing wave of a quarter wave length with a voltage node at the ground end and a voltage antinode at the open end. The voltage amplitude of the standing wave depends on the location of the ionization source in respect to the nodal and antinodal points. It will be smallest when the source is nearest to the voltage node and largest when it is nearest to the voltage antinode.

The intensity of the surge or disturbance or its maximum amplitude depends on the particular position of the spot where it is excited by ionization. The nearer to the nodal point the source is located the weaker is this amplitude. If the weak spot at which ionization is occurring is located at the exact center of the cable section 261, the two readings of the indicator 260, taken with the receiving apparatus connected to opposite ends of the cable, will be the same, since the excitation is then the same for both cases, no matter what end of the cable is grounded and which one is open for the high frequency oscillation. For any other point the excitation will be larger for that particular position of the switch 249 which places the ionization spot nearer.

In Figure 10 we have shown, graphically, a series of readings of the meter 260 in which the curve EL is taken with the receiving apparatus connected to the left hand end of the cable that is, with the knife switch 249 connected to the point 247, and the curve ER is taken with the knife switch connected to the point 248 so that the receiving apparatus is associated with the right hand end of the curve. As shown, the curves intersect at the point 262 and should the readings be taken at this point, the ratio of ER divided by EL will equal one, indicating that the fault is equidistant from the two ends of the cable. If, however, the fault is located at point 263 which is displaced some distance from the center of the cable, the reading EL will have a value corresponding to the point 264 on its curve and the reading ER to a point 265 on its curve, and the ratio of these two readings will be greater than one, indicating that the fault is a greater distance from the right hand end R of the cable section than from the left hand end L.

Returning now to the case $c$ mentioned in connection with the circuit of Figure 5: This case corresponds to the condition when the switch 253 in Figure 9 is open. An inductance 252 is then introduced, increasing greatly the wave length of the cable circuit so that the voltage and current distribution along the cable is nearly uniform. Therefore there will be no difference in the intensities of the oscillations excited by ionization pulses, whether measured at one or the other end of the cable. Both positions of the switch 249 will give similar readings. The circuit thus set is adapted for measuring the degree of ionization irrespective of the location of the source.

In the circuit shown in Figure 9, some difficulty has been experienced due to sparking of the single pole double throw switch during the changeover, this sparking itself causing surges which upset the balance of the high frequency receivers and thereby affecting the reading obtained from the indicator 260. To eliminate this trouble, the circuit shown in Figure 11 has been devised. In this circuit the cable length 300 has its sheath grounded and its conductor 301 connected at opposite ends to the poles 302 and 303 of the knife switch, respectively. Inductances 304 and 305 are bridged around these contacts and connected at 306 to the knife blade 307 of this switch. The supply transformer 308 has its primary 309 connected to the usual source of charging current and its secondary 310 to the primary 311 of an auxiliary transformer 312 whose secondary 313 has one terminal connected to ground and its opposite terminal to the knife blade 307 to the coil 314.

The high frequency circuit consists of a variable condenser 315, a tuned inductance 316 and a fixed inductance 317, the latter being coupled to a pick-up coil 318 of the receiver 319 whose output 320 is connected to a suitable indicating instrument by which commutating readings are made.

Line disturbances in the source to which the primary winding 309 of the transformer 308 is connected are blocked by that transformer and the transformer 312, so that the current placed upon the cable by this arrangement is a pure current free from extraneous noises which will affect the readings of the instrument. The sparking of the knife switch 307, when it is being changed from contact 302 to 303 and vice versa, is avoided by the low resistance of the choke coils 304 and 305, respectively, so that when the high frequency circuit including condenser 315 and inductances 316 and 317 is properly tuned the surges produced in the cable by the ionization of a fault are made to traverse this circuit to ground. The pick-up coil 318 of the receiving set 319 is thus energized, and current caused to flow through that receiving set to actuate the indicating instrument 320, thereby giving a readable deflection. Readings are taken first from one end of the cable and then from the other, and by the ratios of these readings the distance of the fault from the ends of the cable can be determined in the manner hereinbefore explained.

In the circuit shown in Figure 12 we have arranged the apparatus of our invention so that calculation of the ratio between the strength of the surges picked up from one end of the cable to those picked up from the other end of the cable is made automatically, instead of manually as before. In this embodiment of our invention, the supply transformer 330 has its primary winding 331 adapted to be connected to the source of charging current, and its secondary winding 332 connected at one terminal to the sheath 333 of the cable under test and at the other terminal to the junction point 334 between the inductances 335 and 336. The inductance 335 is connected to the filament 337 of a rectifier 338, preferably a thermionic rectifier whose plate 339 is connected to the conductor 340 of the cable sample 333.

The inductance 336 is similarly connected to the filament 341 of the thermionic rectifier 342 whose plate 343 is connected to the opposite end of the conductor 340 of the cable sample.

A high frequency circuit, comprising inductance 344 and condenser 345, is connected around the thermionic device 338 and between the cable conductor 340 and sheath 333, and a similar high frequency circuit consisting of inductance 346 and condenser 347 is similarly connected around the thermionic rectifier 342.

When the supply transformer 330 is energized, the voltage induced in the secondary during one half of the cycle will impress a potential on the left hand end of the cable through the thermionic device 338, and during the other half of the cycle will impress a similar potential upon the right hand end of the cable through the thermionic device 342. During the time that the cable is being charged from the rectifier 338 the thermionic device 342 holds the opposite end of the circuit open, and when the cable is being charged from the rectifier 342 the device 338 holds the left hand end of the cable circuit open. By this arrangement the cable section is alternately charged first from one end and then the other by charges of equal potential delivered from the transformer 332 through the rectifiers 338 and 342.

The receiving circuits, consisting of a pick-up coil 350 associated with the inductance 344, and the pick-up coil 351 associated with the inductance coil 346 are, respectively, connected through receiving apparatus 352 and 353, the output circuits of which are connected to coils of the indicator 354.

The indicator 354 consists of a permanent magnet having poles 355 and 356 spaced apart, with coils 357 and 358 which constitute the movable elements pivoted between the poles of the magnet. The coils 357 and 358 are displaced 90° from each other. The coil 357 is connected to the output of the receiving apparatus 352 and the coil 358 to the output of the receiving apparatus 353. A suitable pointer 359 is connected to the movable element containing coils 357 and 358 and moves over a scale 360 by which the ratio of surge currents is indicated.

When the voltage of the supply transformer 330 is sufficiently high to cause ionization of the dielectric at some point in the cable, the receiving apparatus will deliver to its output circuit a current whose strength is directly proportional to the potential differences produced by the oscillations across the terminals of the inductance 344, that potential difference being a function of the distance from the end of the cable at which the ionization and consequent surge occur. Similarly, when the cable is being charged by the other half of the cycle, through the other rectifying device, the receiving set 353 will deliver an output current to the coil 358 which will be directly proportional to the potential drop produced by the oscillation across the inductance 346. If the surge occurs at the exact center of the cable section the output current of the amplifier 352 and of the amplifier 353 will be equal and the electromagnetic torque set up by the coils 357 and 358 in the magnetic field of poles 355 and 356 will be equal and in opposite directions. As a result, the pointer 359 will move until a point of equilibrium is reached at the middle of the scale, indicating that the fault is at the mid-section of the cable.

On the other hand, if the fault is nearer one end of the cable than the other the output of the corresponding receiving device will be stronger than the output of the other receiving device, and the electromagnetic torque set up by the coil connected to the receiving device which in turn is connected farthest from the fault will be greater than the torque of the opposite coil. As a result the pointer will be moved in one direction to a new position opposite the scale 360, by which position it indicates the location of the fault in the cable section. The apparatus therefore functions to indicate the location of the incipient fault in the cable, and by reading of the voltage applied to the primary winding 331 of the supply transformer 330 and taking into account the voltage ratio of this transformer, the potential at which this ionization occurs can be determined.

The apparatus shown in Figures 10, 12 and 13 is preferably shielded in the manner as shown in Figure 6 to avoid disturbance of the high frequency circuit by extraneous current picked up by the cable itself or by the testing equipment. This shielding has been omitted from the drawings, which are more or less schematic diagrams of the equipment, as the drawings would be unnecessarily complicated by the addition of shielding.

Our invention disclosed herein is capable of application to a variety of forms of testing the quality of the insulation of cables, condensers and the like. The test may be applied in a simple manner to determine first, that there are dangerous agencies at work in a dielectric, second, that there is a developing fault in the cable, third, the seriousness of the fault at a given potential, and fourth, the position in the cable at which an insidious fault and the fault itself occur. The latter portion of the test obviously has its greatest utility in the testings of cables whose length is very much greater than the thickness of the insulation under test, while the other tests are applicable equally to insulation in condensers as well as to that in cables. Insulating material such as paper or fabric may likewise be tested by the method of our invention to locate microscopic faults which, if permitted to be included, in a cable section, for example, would produce an inhomogeneity through the ionization of which the insulation would be soon ruined and break down would occur.

The circuits herein shown have been shown by way of example only, as they may be modified and adapted to a number of uses within the teachings of our invention by one skilled in the art, and we are therefore to be limited only by the scope of the appended claims.

Having thus complied with the statutes and shown and described a preferred embodiment of our invention what we consider new and desire to have protected by Letters Patent is pointed out in the appended claims.

What is claimed is:

1. The method of testing insulation which comprises impressing on the insulation a potential below the breakdown potential of the insulation and sufficient to cause insulation inhomogeneities to set up disturbance currents, and measuring the disturbance currents set up in the insulation by that potential.

2. The method of testing insulation which comprises impressing a potential of known voltage and frequency on the insulation to drive a charging current through it, and measuring the disturbance currents superimposed on that current.

3. The method of testing insulation which comprises impressing a potential of known voltage and frequency on the insulation to drive a charging current through it, and measuring the periodic disturbance currents originating in said insulation which are superimposed on said charging current.

4. The method of locating inhomogeneities in a cable which comprises, applying a charging potential between the sheath and conductor of the cable alternately from opposite ends of the cable, and comparing the surge currents produced in the cable by such applications.

5. The method of locating weak spots in the insulation of a cable which comprises, impressing a high voltage on the insulation to produce ionization at the weak spots, impressing a standing high frequency wave on the cable, measuring the effect of said ionization on said wave, altering the nodal positions of said wave, and remeasuring the effect of said ionization on the wave.

6. The method of testing cable insulation which comprises, impressing sufficient voltage on the insulation to produce ionization of inhomogeneities in the insulation, amplifying and rectifying the high frequency waves produced by such ionization to detect its presence, and measuring the absorption of said waves by said cable to locate the fault.

7. The method of testing cable insulation which comprises, impressing sufficient voltage on the insulation to produce ionization of inhomogeneities in the insulation, superimposing a high frequency carrier current on said voltage, superimposing the high frequency current occasioned by said ionization on said carrier current to thereby modulate it, amplifying and rectifying said modulated current to separate out the ionization current, and measuring said latter current to detect and locate said ionization.

8. The method of detecting and locating inhomogeneities in dielectric which comprises, impressing a high voltage charging current on the dielectric, superimposing a high frequency wave on that current, and measuring the changes produced in said high frequency wave by the changes in the characteristics of said dielectric produced by said charging current.

9. The method of detecting and locating inhomogeneities in dielectric which comprises, stressing the dielectric under tension high enough to start ionization of the inhomogeneities in the dielectric, propagating high frequency currents through a circuit including the dielectric, and indicating the changes in said currents produced by the redistribution of stresses occasioned by the ionization in said dielectric.

10. The method of detecting and locating inhomogeneities in dielectric which comprises, stressing the dielectric under tension high enough to start ionization of the inhomogeneities in the dielectric, propagating high frequency currents through a circuit including the dielectric, and indicating the changes in the frequency of said currents produced by the redistribution of stresses occasioned by the ionization in said dielectric.

11. A test mechanism for locating incipient faults in insulation which comprises a transformer, a low frequency circuit including the secondary winding of said transformer and the sample under test, a high frequency circuit including also the sample under test, and means actuated over said high frequency circuit for indicating the disturbance currents produced responsive to an energization of said low frequency circuit.

12. In a cable insulation testing mechanism, a charging current supply transformer having one of its terminals connected to the cable sheath, an impedance connecting another terminal of the transformer to the conductor of said cable, a circuit including a condenser and two inductances all serially related, means for connecting said circuit alternately to the opposite ends of said cable conductor, means for tuning said circuit to respond to a frequency different from the frequency of the charging current supply, an amplifier coupled to said tuned circuit, said amplifier being actuated by surge currents produced in said circuit by the ionization of inhomogeneities in said dielectric responsive to the application of a high potential by said transformer, and means operated by said amplifier for indicating and/or measuring the strength of the currents in said circuit to thereby locate the fault in said cable.

13. In a testing mechanism for testing the insulation in a cable having a grounded sheath, a test transformer having one end of its secondary winding grounded, a double throw switch to which the other end of said secondary winding is connected, connections between the ends of the conductor of the cable and opposite position poles of said switch, a high frequency circuit connected in multiple with said transformer secondary, and an indicating instrument actuated over said high frequency circuit by surge currents in said cable as said switch is thrown from one position to another to thereby indicate the position of a fault in the cable.

14. In a testing mechanism for testing the insulation in a cable having a grounded sheath, means for placing a test potential between the conductor and sheath of the cable, a tuned high frequency circuit, means for connecting said circuit to either end of the cable, and an instrument for indicating the surge currents produced in said cable by said test potential.

15. An insulation testing mechanism comprising a low frequency circuit including an impedance, a high frequency circuit including a condenser, a pair of electrodes engaging the insulation sample, said circuits being connected in multiple between said electrodes to thereby include them and the insulation in both of said circuits, said impedance and condenser keeping currents from the one circuit out of the other, and indicating means for measuring the changes in the high frequency currents occasioned by the application of low frequency currents to said sample.

16. In a mechanism for testing insulation, a pair of electrodes engaging the insulation, an oscillating circuit including an inductance and the condenser formed by said electrodes and insulation, means for impressing a potential on said electrodes to change the dielectric characteristics of said insulation, and means for measuring the change in the oscillating characteristics of said circuit occasioned by the said dielectric change to thereby test the insulation.

17. A test mechanism for detecting and locating inhomogeneities in dielectrics comprising, a charging circuit adapted to be energized by variable potentials and including electrodes engaging the dielectric, a high frequency circuit also including said electrodes and dielectric, an indicating instrument in said high frequency circuit, and means for propagating high frequency currents through said circuit to actuate said indicating instrument, said currents being altered by changes in the dielectric produced by the ionization of inhomogeneities resulting from the application of a high potential to said charging circuit, said changes effecting the actuation of said instrument to indicate that ionization is occurring.

18. The method of testing for incipient faults in cable insulation which comprises, impressing a low frequency test voltage between the conductor and sheath of the sample, testing for current flow at a frequency different from said test voltage frequency to indicate the presence of incipient faults, measuring the intensity of said latter current to determine the severity of the fault, altering the nodal points of said latter current, and measuring the altered current to locate the fault.

19. The method of testing the insulation of a cable which comprises connecting a source of low frequency high voltage current between the conductor and sheath at one end of the cable, connecting a resonant circuit between the conductor and sheath of the cable, tuning said resonant circuit to a frequency different from the frequency of said source, and measuring the current flow in said resonant circuit.

20. The method of testing the insulation of a cable which comprises stressing the insulation at known voltage and frequency applied to one end of the cable between the conductor and sheath, connecting between the conductor and sheath of the cable a resonant circuit tuned to respond to a frequency different from said known frequency, and indicating the flow of current in said tuned circuit to indicate the presence of incipient faults in the insulation of the cable.

21. An insulation testing mechanism comprising a test voltage application circuit including an inductive reactance, a tuned circuit including a condenser, means for connecting said circuits together in multiple across an insulation sample to include the sample in both circuits, said reactance and condenser keeping currents from the one circuit out of the other, and means for indicating the flow of current in said tuned circuit to thereby indicate the presence of incipient faults in said insulation.

22. An insulation testing mechanism comprising a test voltage application circuit including an inductive reactance, a tuned circuit including a condenser, means for connecting said circuits together in multiple across an insulation sample to include the sample in both circuits, said reactance and condenser keeping currents from the one circuit out of the other, and means for measuring the intensity of current flow in said tuned circuit to thereby indicate the presence and severity of incipient faults in said insulation.

23. In a testing device for testing the quality of insulation, a transformer having a primary winding adapted for connection to a source of variable voltage constant frequency current and having a secondary winding, means for connecting said secondary winding across the insulation to be tested to thereby impress the voltage induced in said secondary upon the insulation, a circuit tuned to a frequency different from the frequency of said source and connected across said insulation, and means for measuring the current flow in said tuned circuit to thereby determine the quality of said insulation.

24. In a cable testing device for testing the quality of insulation, a transformer having a primary winding adapted for connection to a source of variable voltage low frequency current and having a secondary winding, means for connecting said secondary winding between the sheath and conductor of the cable sample under test to thereby impress the voltage induced in said secondary winding across said insulation, a resonant circuit connected across said insulation including inductance and capacitance serially connected together and connected in multiple with said connecting means at the ends of the sample, said resonant circuit being tuned to a frequency different from the frequency of said low frequency source, and means for measuring the current flow in said resonant circuit to thereby determine the quality of said insulation.

25. Insulation testing apparatus comprising a high voltage source for stressing a test piece below its breakdown point, means other than said source for causing a flow of detection current through the stressed test piece, an instrument for indicating flow of said detection current across said stressed piece, and means for protecting said instrument from the high voltage of said source.

26. Testing apparatus for detecting an insulator fault comprising means for applying a high voltage to the test piece to stress the insulation, a source of detection current in circuit with said test piece, and an instrument for indicating current from said source across the test piece when the test piece is under stress below its breakdown point.

27. The method of detecting incipient faults in dielectrics which comprises, impressing sufficient potential on the dielectric to set up ionization disturbances in it, and measuring the current produced by said disturbances and the potential producing them.

28. The method of detecting the presence and degree of inhomogeneities and incipient fault developments in dielectrics which comprises, charging the dielectric with a potential sufficiently high to set up ionization disturbance currents in the dielectric, amplifying and rectifying the disturbance currents thus produced, and measuring such currents.

29. In a test mechanism for detecting inhomogeneities in dielectrics, the combination of means for charging the dielectric at known potential and frequency, and means including a circuit tuned to a frequency different from said known frequency for detecting surges in the charging current produced by discharges occasioned by said potential.

30. The method of testing insulation for a possible but not yet existing fault, which comprises impressing a high voltage on the insulation, measuring the ionization disturbance in the insulation, and determining the relation between the disturbance currents and the impressed voltage.

ELLERY B. PAINE.
JOSEPH TYKOCINSKI-TYKOCINER.
HUGH A. BROWN.